(12) United States Patent
Nishimura et al.

(10) Patent No.: US 11,473,692 B2
(45) Date of Patent: Oct. 18, 2022

(54) SOLENOID VALVE

(71) Applicant: Eagle Industry Co., Ltd., Tokyo (JP)

(72) Inventors: Naoki Nishimura, Tokyo (JP); Tadanobu Kawato, Tokyo (JP)

(73) Assignee: EAGLE INDUSTRY CO., LTD.

( * ) Notice: Subject to any disclaimer, the term of this patent is extended or adjusted under 35 U.S.C. 154(b) by 251 days.

(21) Appl. No.: 16/754,734

(22) PCT Filed: Nov. 14, 2018

(86) PCT No.: PCT/JP2018/042065
§ 371 (c)(1),
(2) Date: Apr. 8, 2020

(87) PCT Pub. No.: WO2019/102908
PCT Pub. Date: May 31, 2019

(65) Prior Publication Data
US 2020/0278045 A1 Sep. 3, 2020

(30) Foreign Application Priority Data
Nov. 22, 2017 (JP) .............................. JP2017-225040

(51) Int. Cl.
*H01F 7/00* (2006.01)
*F16K 31/06* (2006.01)
(Continued)

(52) U.S. Cl.
CPC ......... *F16K 31/0675* (2013.01); *H01F 7/128* (2013.01); *H01F 7/16* (2013.01)

(58) Field of Classification Search
CPC ........ F16K 31/0675; H01F 7/128; H01F 7/16; H01F 5/02; H01F 7/1607; H01F 2007/085; H01F 7/081
(Continued)

(56) References Cited

U.S. PATENT DOCUMENTS 4,971,116 A * 11/1990 Suzuki ............... G05D 16/2024
137/625.65
5,076,323 A * 12/1991 Schudt ................ F16K 31/0637
251/129.21
(Continued)

FOREIGN PATENT DOCUMENTS

CN 205190900 4/2016 ............. F16K 31/06
JP 7-27246 1/1995 ............. F16K 31/06
(Continued)

OTHER PUBLICATIONS

Chinese Official Action issued in Chinese Patent Application Serial No. 201880065470.2, dated Jul. 2, 2021 (10 pages).
(Continued)

*Primary Examiner* — Shawki S Ismail
*Assistant Examiner* — Lisa N Homza
(74) *Attorney, Agent, or Firm* — Hayes Soloway P.C.

(57) ABSTRACT

A solenoid valve includes: a movable iron core; a molded solenoid body disposed outside the movable iron core in a radial direction; a solenoid case that accommodates the movable iron core and the molded solenoid body; and a stationary iron core disposed radially inside the molded solenoid body, and generates a magnetic force between the movable iron core and the stationary iron core when a coil is energized, the stationary iron core including a thin portion circumferentially formed and thinned in a circumferential direction, and a flange portion formed at a first axial end of the stationary iron core to extend outward in the radial direction.

13 Claims, 5 Drawing Sheets

(51) Int. Cl.
  *H01F 7/128* (2006.01)
  *H01F 7/16* (2006.01)
(58) Field of Classification Search
  USPC ........................................................ 335/278
  See application file for complete search history.

(56) References Cited

U.S. PATENT DOCUMENTS

| | | | | |
|---|---|---|---|---|
| 6,315,268 | B1* | 11/2001 | Cornea | H01F 7/081 |
| | | | | 137/625.68 |
| 6,367,434 | B1* | 4/2002 | Steigerwald | F15B 13/0821 |
| | | | | 123/90.15 |
| 6,619,615 | B1* | 9/2003 | Mayr | H01F 7/1607 |
| | | | | 251/129.08 |
| 7,686,038 | B2* | 3/2010 | Chavanne | F16K 31/0631 |
| | | | | 137/625.65 |
| 8,134,436 | B2* | 3/2012 | Yasoshima | H01F 7/127 |
| | | | | 335/220 |
| 9,464,728 | B2 | 10/2016 | Herrmann | F16K 31/00 |
| 2002/0007549 | A1 | 1/2002 | Oishi et al. | 29/596 |
| 2006/0243938 | A1 | 11/2006 | Ishibashi et al. | 251/129.15 |
| 2010/0326552 | A1* | 12/2010 | Suzuki | F15B 13/0402 |
| | | | | 137/625.69 |
| 2011/0115587 | A1 | 5/2011 | Ishibashi | 335/255 |
| 2012/0126158 | A1 | 5/2012 | Yasoshima et al. | 251/129.15 |
| 2016/0329143 | A1* | 11/2016 | Irie | F16K 31/06 |
| 2018/0372129 | A1 | 12/2018 | Kato et al. | F15B 13/04 |

FOREIGN PATENT DOCUMENTS

| | | | | |
|---|---|---|---|---|
| JP | 9-250650 | 9/1997 | ............ | F16K 31/06 |
| JP | 2002-27723 | 1/2002 | ............ | H02K 33/02 |
| JP | 2002-188747 | 7/2002 | ............ | F16K 31/06 |
| JP | 2006-307984 | 11/2006 | ............ | F16K 31/06 |
| JP | 2007-211857 | 8/2007 | ............ | F16K 31/06 |
| JP | 2010-106899 | 5/2010 | ............ | F16K 31/06 |
| JP | 2010-223279 | 10/2010 | ............ | F16K 31/06 |
| JP | 2011-108781 | 6/2011 | ............... | H01F 7/16 |
| JP | 2011-228568 | 11/2011 | ............... | H01F 7/16 |
| JP | 2012-122609 | 6/2012 | ............ | F16K 31/06 |
| JP | 2014-110372 | 6/2014 | ............... | H01F 7/16 |
| JP | 2014-232768 | 12/2014 | ............... | H01F 7/16 |
| JP | 2015-75165 | 4/2015 | ............ | F16K 31/06 |
| JP | 2015-517631 | 6/2015 | ............... | H01F 7/16 |
| JP | 2015-195301 | 11/2015 | ............... | H01F 7/16 |
| JP | 2016-211657 | 12/2016 | ............ | F16K 11/07 |
| JP | 2017-157791 | 9/2017 | ............ | H01K 42/02 |
| JP | 2019-7572 | 1/2019 | ............ | F16K 31/06 |
| WO | WO2015115298 | 8/2015 | ............... | H01K 7/06 |

OTHER PUBLICATIONS

Chinese Official Action issued in Chinese Patent Application Serial No. 201880065470.2, dated Dec. 8, 2021 (12 pages).
International Search Report and Written Opinion issued in PCT/JP18/042065, dated Feb. 5, 2019, with English translation, 16 pgs.
International Preliminary Report on Patentability issued in PCT/JP18/042065, dated May 26, 2020, English translation, 8 pgs.
International Search Report and Written Opinion issued in PCT/JP2018/042066, dated Feb. 5, 2019, with English translation, 18 pgs.
International Search Report on Patentability issued in PCT/JP2018/04206, dated May 26, 2020, with English translation, 9 pgs.
International Search Report and Written Opinion issued in PCT/JP2020/030962, dated Nov. 2, 2020, with English translation, 14 pgs.
International Preliminary Report on Patentability issued in PCT/JP2020/030962, dated Mar. 10, 2022, English translation, 6 pages.
Official Action issued in related U.S. Appl. No. 16/754,734, dated Mar. 30, 2022, 29 pages.
Official Action issued in related U.S. Appl. No. 16/756,115, dated Sep. 15, 2021, 12 pages.
Official Action issued in related U.S. Appl. No. 16/756,115, dated Apr. 1, 2021, 9 pages.
Chinese Official Action issued in corresponding Chinese Application Serial No. 201880065703.9, dated Jul. 14, 2021 (12 pages) with translation.
Chinese Official Action issued in corresponding Chinese Application Serial No. 201880065703.9, dated Jan. 27, 2022 (13 pages) with translation.
Japanese Official Action issued in Japanese Patent Application Serial No. 2019-555271, dated Mar. 10, 2022 (6 pages) with translation.

\* cited by examiner

SOLENOID VALVE

TECHNICAL FIELD

The present invention relates to a solenoid valve that is used, for example, for hydraulic control of a hydraulic circuit.

BACKGROUND ART

In the background art, there is known a solenoid valve for hydraulic control including: a molded solenoid body which is accommodated in a yoke formed of a magnetic body, and includes a coil; a stator having a cylindrical shape which is disposed inside the molded solenoid body; and a plunger having a tubular shape which is accommodated inside the stator, in which a magnetic circuit is formed by the yoke, the stator, and the plunger when the coil is energized, and in which a magnetic force (e.g., suction force) is generated between the stator and the plunger to move the plunger inside the stator in an axial direction (for example, refer to Patent Citation 1).

In addition, in such a solenoid valve, a thin portion (so-called magnetism blocking portion) with large magnetic resistance is provided by circumferentially thinning the plate thickness of a part of the stator, and thus, a magnetic flux flow path in the vicinity of the thin portion is biased toward the plunger. Therefore, a magnetic force applied to the plunger is increased.

CITATION LIST

Patent Literature

Patent Citation 1: JP 2012-122609 A (page 5 and first drawing)

SUMMARY OF INVENTION

Technical Problem

However, in Patent Citation 1, in a state where at a position on an opening side of the yoke, the other axial end portion of a sleeve of a valve unit is in contact with a flange portion extending in a radial direction from one axial end portion of the stator, when a swaging operation is performed, namely, when the stator is integrally fixed to the yoke by swaging an opening side end portion of the yoke inward in the radial direction, since a swaging is in contact with one axial end of the yoke and a swaging tool comes into contact with the other axial end, there is a possibility that an axial force is applied to the yoke and an axial load is applied to the thin portion of the stator disposed inside the yoke. For this reason, it is necessary to secure the strength of the thin portion, but there is a limit to the range where the plate thickness of the thin portion can be thinned, and thereby exerting an influence on the performance of the magnetism blocking portion, which is a problem. In addition, since the opening side end portion of the yoke is swaged inward in the radial direction in a state where the other axial end portion of the sleeve of the valve unit is in contact with one end portion of the stator, depending on the dimensions of the other axial end portion of the sleeve, the other axial end portion of the stator is in contact with the yoke, and thus, an axial load is applied thereto, which is a problem.

The present invention is made in light of the foregoing problem, and an object of the present invention is to provide a solenoid valve in which the plate thickness of a thin portion of a stationary iron core can be further thinned.

Solution to Problem

In order to solve the foregoing problems, a solenoid valve according to a first aspect of the present invention includes: a movable iron core that is movable in an axial direction; a molded solenoid body that is disposed outside the movable iron core in a radial direction; a solenoid case that accommodates the movable iron core and the molded solenoid body; and a stationary iron core that is disposed inside the molded solenoid body in the radial direction, and generates a magnetic force between the movable iron core and the stationary iron core when a coil of the molded solenoid body is energized, the stationary iron core including a thin portion which is circumferentially formed and of which a plate thickness is thinned, and a flange portion that is formed at a first axial end of the stationary iron core to extend outward in the radial direction, in which an annular planar portion extending in the radial direction is formed inside the solenoid case in the radial direction, the flange portion is swaged between a first axial end of the solenoid case and the annular planar portion of the solenoid case, and a gap is formed in the axial direction between a second axial end of the stationary iron core and the solenoid case.

According to the aforesaid characteristic, since the flange portion of the stationary iron core is swaged back and forth in the axial direction between one axial end of the solenoid case and the annular planar portion, so that the stationary iron core and the solenoid case are fixed, and a gap is formed in the axial direction between the second axial end of the stationary iron core and the solenoid case; and thereby, it is possible to realize a structure where a load is prevented from being applied to the stationary iron core and is unlikely to have an influence on the thin portion of the stationary iron core, and it is possible to further thin the plate thickness of the thin portion.

It is preferable that the molded solenoid body is integrally formed with the stationary iron core, and a gap is formed in the axial direction between the solenoid case and one axial end of the molded solenoid body on a side of the second axial end of the stationary iron core.

Accordingly, it is possible to prevent a load from being applied to the molded solenoid body; and thereby, it is possible to prevent damage to the molded solenoid body. Furthermore, a load which is applied in the axial direction when the first axial end of the solenoid case is swaged to the flange portion of the stationary iron core is applied to the molded solenoid body which is integrally formed with the stationary iron core, to deform the molded solenoid body; and thereby, it is possible to realize a structure where a load is prevented from being applied to the stationary iron core and is unlikely to have an influence on the thin portion of the stationary iron core.

It is preferable that a step portion is formed in the solenoid case on a side of a second axial end thereof and outside the thin portion in the radial direction.

Accordingly, since a load which is applied in the axial direction when the first axial end of the solenoid case is swaged to the flange portion of the stationary iron core is received by the step portion that is provided on the second axial end side of the solenoid case and outside the thin portion of the stationary iron core in the radial direction, the load is unlikely to be applied to the thin portion of the stationary iron core inside the solenoid case.

It is preferable that a protrusion portion having a hollow structure is formed in the solenoid case on the side of the second axial end thereof, and the second axial end of the stationary iron core is fitted into the protrusion portion.

Accordingly, since the second axial end of the stationary iron core can be disposed adjacent to the solenoid case in the radial direction, it is possible to secure a magnetic flux flow path with reduced magnetic resistance between the step portion of the solenoid case and the second axial end of the stationary iron core.

It is preferable that the plate thickness of the thin portion is 0.4 mm or less.

Accordingly, since the plate thickness of the thin portion of the stationary iron core is 0.4 mm or less, which is very thin, when a magnetic circuit is formed by energizing the coil, the magnetic resistance in the thin portion becomes larger, and a magnetic flux flow path in the vicinity of the thin portion is biased toward the movable iron core; and thereby, it is possible to increase a magnetic force applied to the movable iron core.

DESCRIPTION OF EMBODIMENTS

Figure 2:
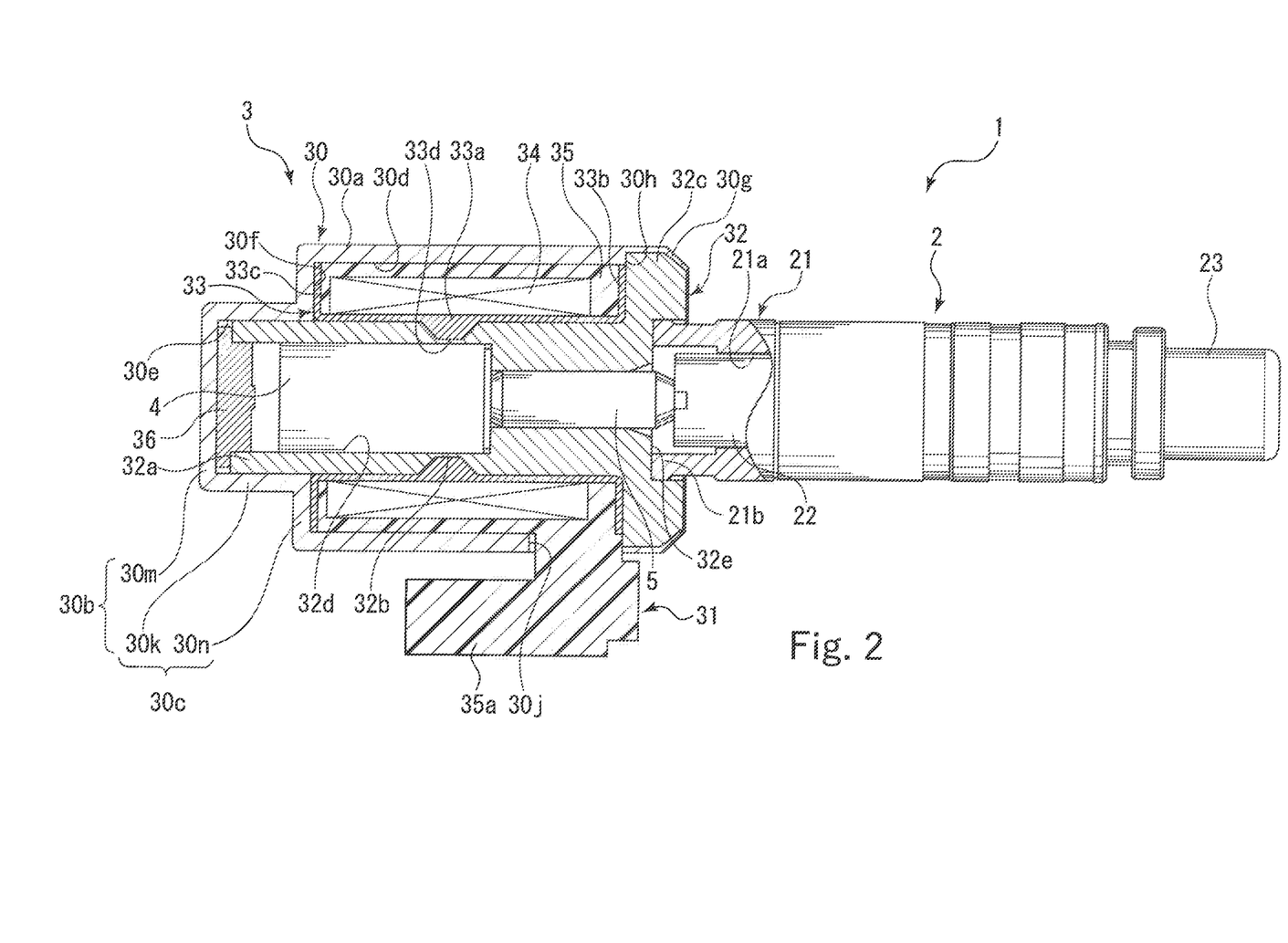
FIG. 2 is a partially-cutout sectional view illustrating the structure of the solenoid valve according to the first embodiment.
Figure 4:
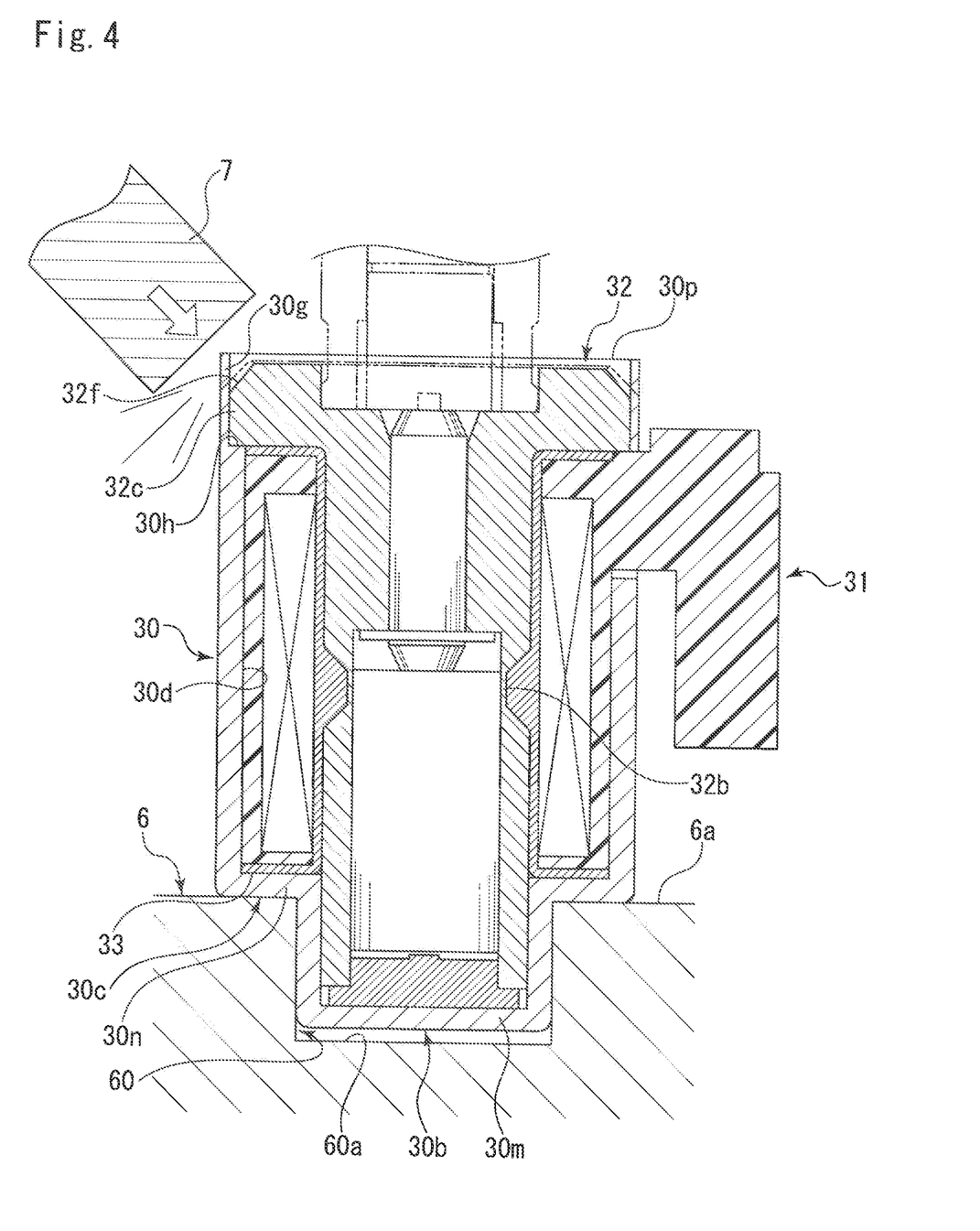
FIG. 4 is a partially-cutout sectional view of the solenoid case according to the first embodiment for illustrating a method of swaging the center post to a solenoid case by using a swaging jig.
Figure 5:
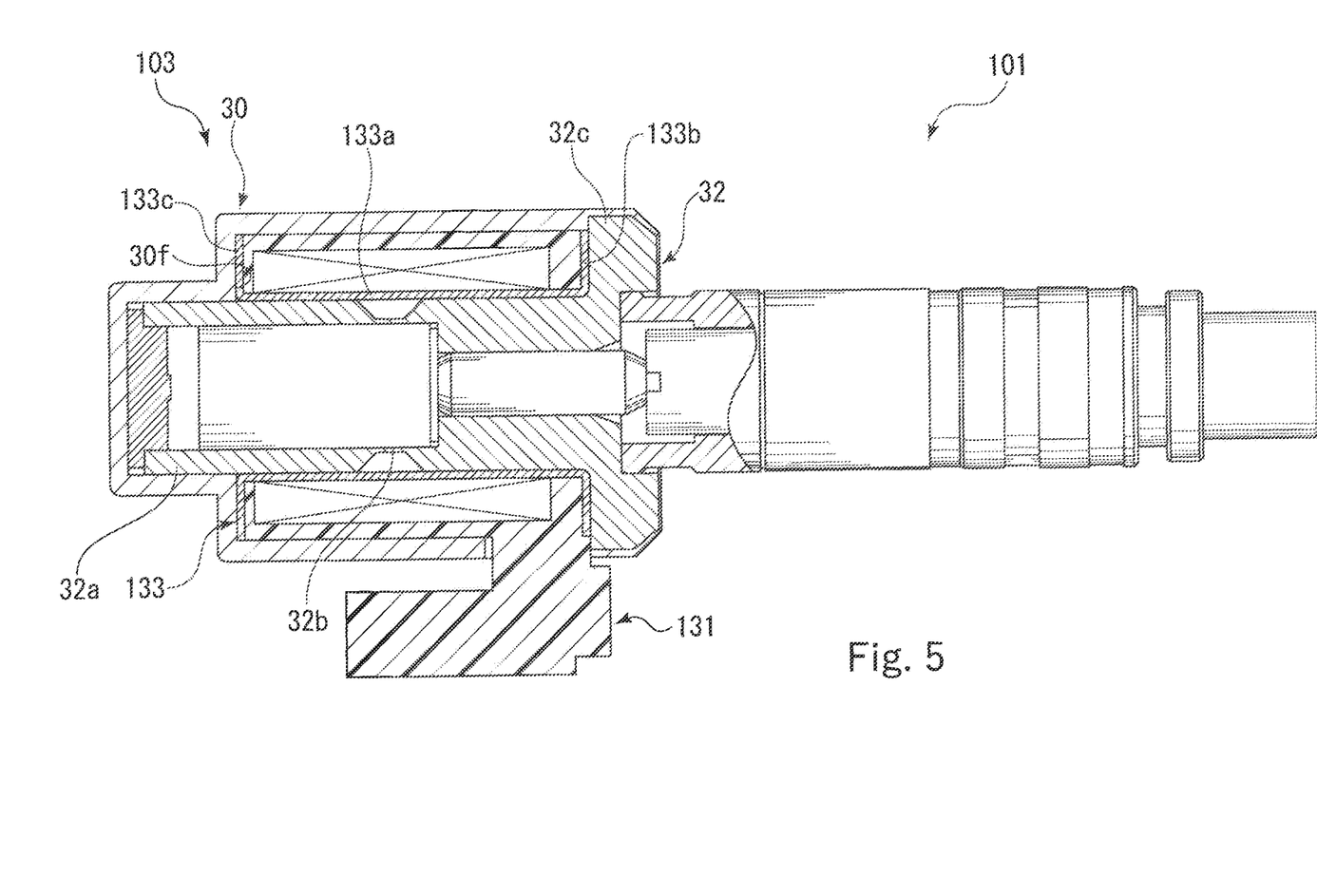
FIG. 5 is a partially-cutout sectional view illustrating the structure of a solenoid valve according to a second embodiment of the present invention.

Hereinafter, a mode for carrying out a solenoid valve according to the present invention will be described based on embodiments. Incidentally, a plunger 4, a rod 5, and a spool 22 illustrated in FIGS. 2, 4, and 5 are not illustrated in sectional views but in side views.

First Embodiment

A solenoid valve according to a first embodiment of the present invention will be described with reference to FIGS. 1 to 4. The following description will be given based on the assumption that the left side of the drawing sheet of FIG. 2 is an upper side of the solenoid valve and the right side of the drawing sheet of FIG. 2 is a lower side of the solenoid valve.

A solenoid valve 1 is a spool-type solenoid valve, and is used in a hydraulically controlled device such as an automatic transmission of a vehicle. Incidentally, the solenoid valve 1 is attached to an attached member such as a valve housing (not illustrated) in a horizontal direction.

Figure 1:
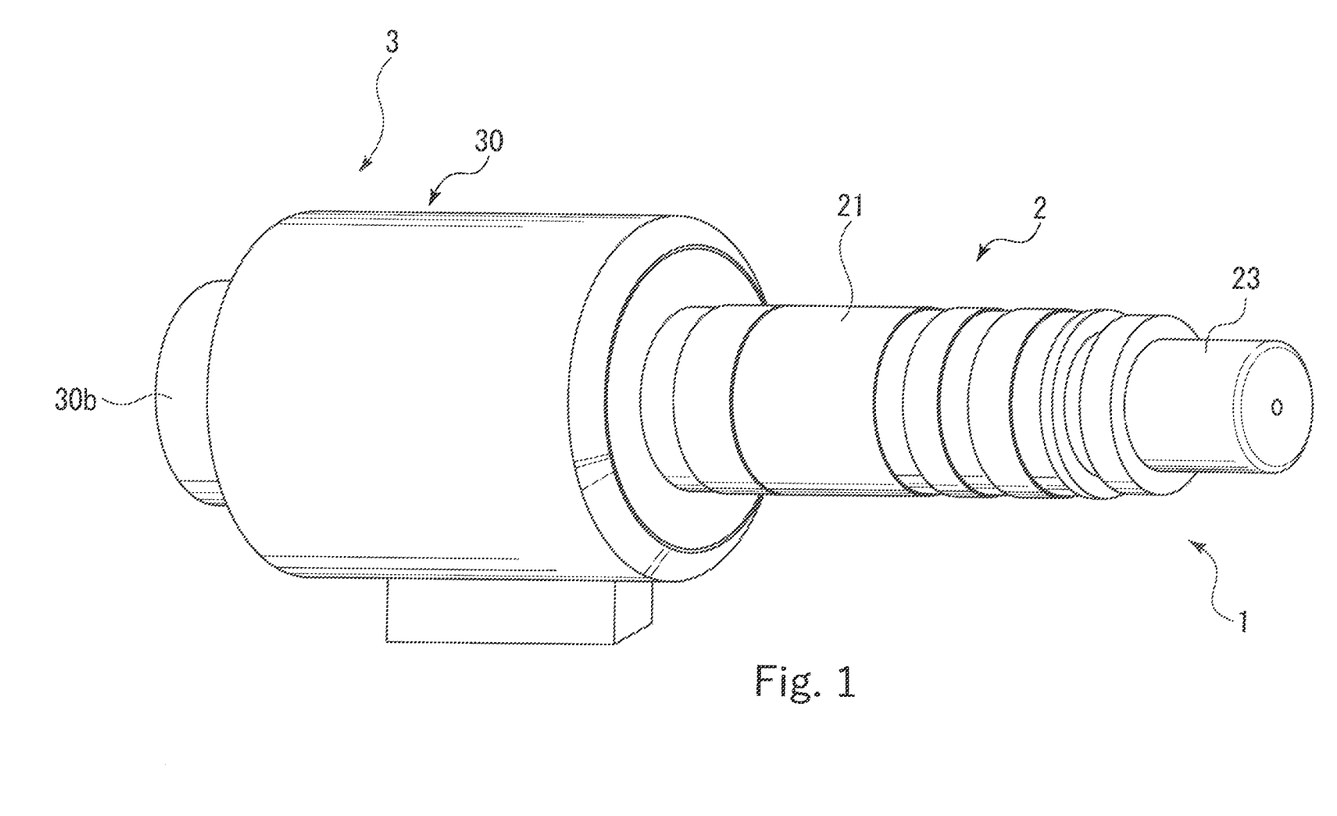
FIG. 1 is a perspective view of a solenoid valve according to a first embodiment of the present invention.

As illustrated in FIGS. 1 and 2, the solenoid valve 1 is configured such that a valve unit 2 which regulates the flow rate of a fluid as a valve is integrally attached to a solenoid unit 3 as an electromagnetic drive unit. Incidentally, FIG. 2 illustrates a state where a coil 34 of a molded solenoid body 31 is energized and the solenoid valve 1 is turned on.

The valve unit 2 is formed of a sleeve 21 of which the outer periphery is provided with openings (not illustrated) such as input ports or output ports which are connected to flow passages provided in the valve housing (not illustrated), the spool 22 that is liquid-tightly accommodated in a through hole 21a of the sleeve 21 and has a plurality of lands (not illustrated), a spring (not illustrated) with a coil shape that biases the spool 22 leftward in an axial direction, and a retainer 23 that is attached to a right axial side of the sleeve 21 to hold the spring. Since this configuration is a well-known configuration of the spool valve, the detailed description thereof will fee omitted. Incidentally, the sleeve 21, the spool 22, and the retainer 23 are made of a material such as aluminum, steel, stainless steel, or resin.

As illustrated in FIG. 2, the solenoid unit 3 is mainly formed of a solenoid case 30 made of a metallic material such as steel having magnetic properties, the molded solenoid body 31 that is accommodated in the solenoid case 30, and a center post 32 (i.e., stationary iron core) that is disposed inside the molded solenoid body 31 in the radial direction.

The solenoid case 30 is mainly formed of a cylindrical portion 30a that covers an outer periphery of the melded solenoid body 31, and a protrusion portion 30b having a bottomed cylindrical shape which is formed on a left axial side of the cylindrical portion 30a to protrude leftward in the axial direction and have a smaller diameter than that of the cylindrical portion 30a. The cylindrical portion 30a and the protrusion portion 30b are disposed such that central axes thereof substantially coincide with each other. The protrusion portion 30b is formed of a bottom plate 30m having a disk shape, and a side plate 30k having a cylindrical shape that is orthogonally connected to the bottom plate 30m and extends in the axial direction. In addition, an annular step portion 30c is formed at a left axial end of the cylindrical portion 30a to include the side plate 30k and an end plate 30n having an annular shape which extends orthogonal to the side plate 30k outward in a radial direction and is orthogonally connected to the cylindrical portion 30a. Incidentally, the end plate 30n of the annular step portion 30c serves as a step portion that receives an axial load when swaging to be described later is performed.

In addition, the inside of the solenoid case 30 is formed of a first cylindrical accommodation portion 30d which is formed by an inner face of the cylindrical portion 30a to accommodate the molded solenoid body 31, and a second cylindrical accommodation portion 30e which is formed on a left axial side of the first cylindrical accommodation portion 30d by an inner face of the protrusion portion 30b, and into which a left axial end portion of a cylindrical portion 32a of the center post 32 is inserted. The end plate 30n described above is formed on the left axial side of the first cylindrical accommodation portion 30d in the radial direction. Namely, the end plate 30n of the annular step portion 30c of the solenoid case 30 is formed radially outside with respect to the cylindrical portion 32a (including a thin portion 32b described later) of the center post 32 and on a left axial side of the cylindrical portion 32a.

In addition, a predetermined range in the solenoid case 30 from an open end 30p (refer to FIG. 4) on a right axial side of the cylindrical portion 30a toward the left in the axial direction is thinned to form a claw portion 30g. Incidentally, an annular planar portion 30h extending toward an inner diameter side in the radial direction is formed on a left axial side of the claw portion 30g in a right axial end portion of the cylindrical portion 30a. The annular planar portion 30h is orthogonally connected to an inner face of the first cylindrical accommodation portion 30d on the inside in the radial direction.

As illustrated in FIG. 2, the center post 32 has the shape of a flanged cylinder which is formed of the cylindrical portion 32a and a flange portion 32c that extends in the radial direction in a right axial end portion of the cylindrical portion 32a. A through hole 32d capable of accommodating the plunger 4 and the rod 5 is formed at a radial center of the cylindrical portion 32a. A holder 36 made of resin or the like is attached to an open end on a left axial side of the cylindrical portion 32a. Incidentally, a left axial end face of the holder 36 which is attached to the open end on the left axial side of the cylindrical portion 32a is provided slightly apart from the bottom plate 30m of the protrusion portion 30b of the solenoid case 30, so that a gap (not shown in Drawings) is formed in the axial direction between the bottom plate 30m and the holder 36. This is, from the perspective of the transmission of force, equivalent to the fact that a gap is formed in the axial direction between the left-side axial end of the center post 32 and the solenoid case 30.

In addition, the thin portion 32b is provided in the cylindrical portion 32a of the center post 32 to have a plate thickness thinner than thicknesses of the other portions of the center post 32 and an isosceles trapezoidal shape in a sectional view by recessing a substantially axial center of an outer peripheral face of the cylindrical portion 32a inward in the radial direction over a circumferential direction. Incidentally, the plate thickness of the thin portion 32b of the center post 32 is 0.4 mm or less.

A recess portion 32e which is recessed leftward in the axial direction is provided at a radial center of a right axial end face of the flange portion 32c of the center post 32. An attachment portion 21b of the sleeve 21 is attached and fixed to the flange portion 32c in a state where the attachment portion 21b is inserted into the recess portion 32e. Incidentally, chamfering is applied to an outer peripheral edge of the right axial end face of the flange portion 32c.

In addition, in a state where an outer peripheral edge portion of a left axial end face of the flange portion 32c of the center post 32 is brought into contact with the annular planar portion 30h that is formed inside the right axial end portion of the cylindrical portion 30a of the solenoid case 30 in the radial direction, the claw portion 30g is swaged along a chamfered portion 32f (refer to FIG. 4) that is formed at the foregoing outer peripheral edge of the right axial end face of the flange portion 32c; and thereby, the center post 32 is fixed to the solenoid case 30 in the axial direction. A method for swaging the center post 32 to the solenoid case 30 will be described in detail in subsequent paragraphs.

As illustrated in FIG. 2, the molded solenoid body 31 is mainly formed of a bobbin 33 that is provided outside the cylindrical portion 32a of the center post 32 in the radial direction, and the coil 34 that is wound on an outside of the bobbin 33 in the radial direction. The molded solenoid body 31 is formed by molding the bobbin 33 and the coil 34 with a resin 35. A control current is supplied to the coil 34 from a connector of a connector portion 35a extending outward from an opening portion 30j that is provided on a lower side of the solenoid case 30 in the radial direction.

The bobbin 33 of the molded solenoid body 31 is substantially U-shaped in a sectional view and includes a cylindrical portion 33a that extends straight in the axial direction along an outer periphery of the cylindrical portion 32a of the center post 32, a flange portion 33b that extends in the radial direction from a right axial end portion of the cylindrical portion 33a along the left axial end face of the flange portion 32c of the center post 32, and a flange portion 33c that extends in the radial direction from a left axial end portion of the cylindrical portion 33a along an annular planar portion 30f which is equivalent to an inner face of the end plate 30n of the annular step portion 30c of the solenoid case 30. In addition, an annular protrusion portion 33d having an isosceles trapezoidal shape in a sectional view is formed on an inside of the cylindrical portion 33a of the bobbin 33 in the radial direction at a predetermined position in the axial direction. The annular protrusion portion 33d is provided along an outer periphery of the thin portion 32b that is formed in the cylindrical portion 32a of the center post 32. Furthermore, the flange portion 33c of the bobbin 33 is provided slightly apart from the annular planar portion 30f of the solenoid case 30, so that a gap (not shown in drawings) is formed between the flange portion 33c of the bobbin 33 and the annular planar portion 30f of the solenoid case 30 in the axial direction. Incidentally, the bobbin 33 is made of an insulator such as resin with high rigidity or ceramic, and is integrally molded with the center post 32.

Figure 3A:
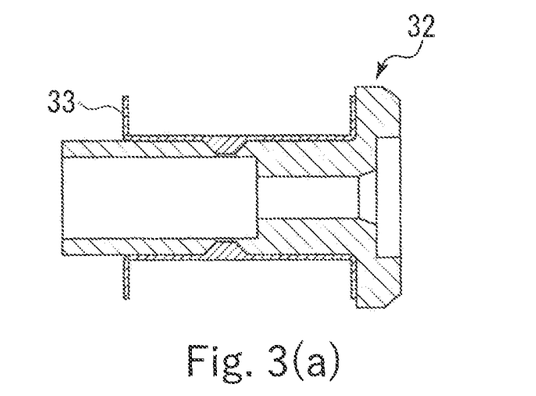
FIG. 3A to 3C are sectional views illustrating steps of processing for a molded solenoid body that is integrally molded with a center post in the solenoid valve according to the first embodiment.
Figure 3B:
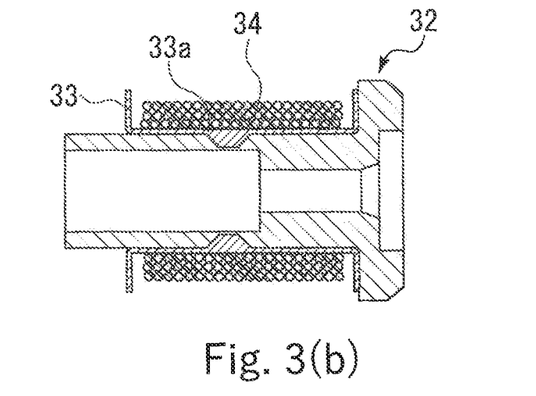
Figure 3C:
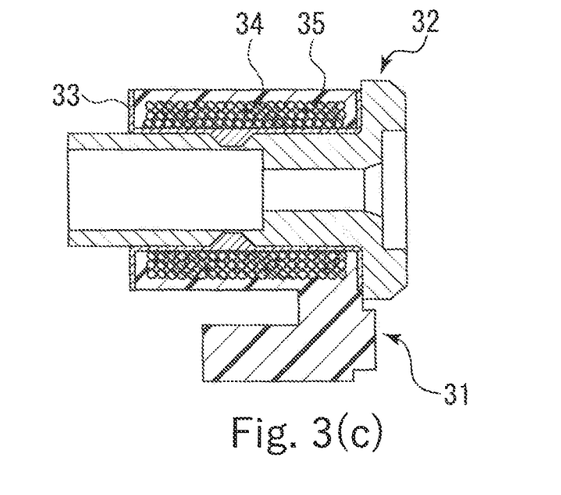

The steps of producing the molded solenoid body 31 will be described hereinafter. As illustrated in FIG. 3A, firstly, the center post 32 is integrally molded with the bobbin 33 by installing the center post 32 in a molding die (not illustrated) and injecting a material such as resin or ceramic into the molding die. Subsequently, the entirety of the molded solenoid body 31 is integrally formed with the center post 32 by installing the center post 32, the bobbin 33, and the coil 34 in the molding die (not illustrated) after winding the coil 34 around the cylindrical portion 33a of the bobbin 33 as illustrated in FIG. 33, and molding the center post 32, the bobbin 33, and the coil 34 with the resin 35 (refer to FIG. 3C).

Subsequently, the method for swaging the center post 32 to the solenoid case 30 will be described with reference to FIG. 4. Incidentally, FIG. 4 illustrates a state where the solenoid valve is vertically disposed, and the description will be given based on the assumption that the upper side of the drawing sheet of FIG. 4 is the upper side of the solenoid valve and the lower side of the drawing sheet is the lower side of the solenoid valve.

The center post 32 is swaged to the solenoid case 30 by hitting the claw portion 30g of the solenoid case 30 with a swaging bar 7 along the chamfered portion 32f formed at an outer peripheral edge of an upper axial end face of the flange portion 32c of the center post 32 in a state where as illustrated in FIG. 4, the protrusion portion 30b of the solenoid case 30 is inserted from above into a recess portion 60 provided in a swaging table 6.

Since the recess portion 60 of the swaging table 6 has substantially the same diameter as that of the protrusion portion 30b of the solenoid case 30, and has a depth in the axial direction larger than the amount of protrusion of the protrusion portion 30b of the solenoid case 30, when the protrusion portion 30b of the solenoid case 30 is inserted from above into the recess portion 60 of the swaging table 6, a lower axial end face of the end plate 30n having an annular shape in the solenoid case 30 can come into contact with an upper face 6a of the swaging table 6 in a state where a bottom face 60a of the recess portion 60 of the swaging table 6 is spaced apart from the bottom plate 30m on a lower axial side of the protrusion portion 30b of the solenoid case 30 in the axial direction. In addition, since the protrusion portion 30b of the solenoid case 30 is inserted from above into the recess portion 60 of the swaging table 6, the solenoid case 30 is restricted from moving in the radial direction; and thereby, it is possible to prevent an offset in the radial direction between the center post 32 and the solenoid case 30 when swaging is performed. Incidentally, in an assembly operation of the solenoid valve 1, either one of an operation of swaging the center post 32 to the solenoid case 30 and an operation of swaging the center post 32 to the sleeve 21 may be preferentially performed.

Accordingly, the flange portion 32c of the center post 32 is fixed back and forth in the axial direction between the claw portion 30g on one axial end side of the solenoid case 30 and the annular planar portion 30h by swaging; and thereby, the center post 32 is fixed to the solenoid case 30. Since the center post 32 and the solenoid case 30 have such dimensions that the gap is formed in the axial direction between the other axial end of the center post 32 (i.e., the left axial end face of the holder 36) and the bottom plate 30m of the protrusion portion 30b of the solenoid case 30, it is possible to realize a structure where a load is prevented from being applied to the center post 32 and is unlikely to have an influence on the thin portion 32b of the center post 32 when the claw portion 30g of the solenoid case 30 is swaged to the flange portion 32c of the center post 32, and it is possible to further thin the plate thickness of the thin portion 32b.

In addition, since the molded solenoid body 31 and the center post 32 are integrally formed, and the gap is formed in the axial direction between the other axial end of the molded solenoid body 31 (i.e., the flange portion 33c of the bobbin 33) and the annular planar portion 30f of the solenoid case 30, it is possible to prevent a load from being applied to the molded solenoid body 31, and to prevent damage to the molded solenoid body 31. Furthermore, a load which is applied in the axial direction when the claw portion 30g of the solenoid case 30 is swaged to the flange portion 32c of the center post 32 is applied to the molded solenoid body 31 which is integrally formed with the center post 32 to deform the molded solenoid body 31; and thereby, it is possible to realize a structure where a load is prevented from being applied to the center post 32 and is more unlikely to have an influence on the thin portion of the center post 32.

In addition, since a load which is applied in the axial direction when the claw portion 30g of the solenoid case 30 is swaged to the flange portion 32c of the center post 32 is received by the end plate 30n of the annular step portion 30c that is provided on the left axial end side of the solenoid case 30 and outside the cylindrical portion 32a (including the thin portion 32b) of the center post 32 in the radial direction, the load is unlikely to be applied to the thin portion 32b of the center post 32 inside the solenoid case 30 in the axial direction; and thereby, it is possible to further thin the plate thickness of the thin portion 32b of the center post 32.

In addition, since the cylindrical portion 33a of the bobbin 33 which is integrally molded on the outside of the center post 32 in the radial direction extends in the axial direction along the outer periphery of the cylindrical portion 32a of the center post 32, and the annular protrusion portion 33d of the bobbin 33 is provided along the outer periphery of the thin portion 32b of the center post 32, it is possible to reinforce the structural strength of the cylindrical portion 32a of the center post 32 against loads in the axial direction and in the radial direction with the molded solenoid body 31; and thereby, it is possible to reduce the influence of a load on the thin portion 32b of the center post 32.

In addition, since the left axial end of the cylindrical portion 32a of the center post 32 is spaced apart from the solenoid case 30 (i.e., the protrusion portion 30b) with the gap therebetween in the axial direction, an axial load received by the bottom plate 30m of the protrusion portion 30b of the solenoid case 30 is unlikely to have an influence on the cylindrical portion 32a (including the thin portion 32b) of the center post 32 inside the annular step portion 30c of the solenoid case 30 in the radial direction. Incidentally, in a case where the protrusion portion 30b of the solenoid case 30 is deformed to come into contact with the holder 36 made of resin which is attached to the open end, namely, the left axial end of the cylindrical portion 32a of the center post 32, the holder 36 serves as a cushioning member between the protrusion portion 30b and the cylindrical portion 32a of the center post 32.

As described above, in the solenoid valve 1 according to the first embodiment, since loads in the axial direction and in the radial direction are unlikely to be applied to the cylindrical portion 32a (including the thin portion 32b) of the center post 32, the thin portion 32b of the center post 32 is allowed to have a plate thickness of 0.4 mm or less. As described above, since the plate thickness of the thin portion 32b of the center post 32 is very thin, when a magnetic circuit is formed by energizing the coil 34 in a state where the solenoid valve 1 is turned on, the magnetic resistance in the thin portion 32b of the center post 32 becomes larger and a magnetic flux flow path in the vicinity of the thin portion 32b is biased toward the plunger 4; and thereby, it is possible to increase a magnetic force applied to the plunger 4.

Furthermore, as illustrated in FIG. 2, since inside the annular step portion 30c in the radial direction which is formed in a left axial end portion of the solenoid case 30, the left axial end portion of the cylindrical portion 32a of the center post 32 is fitted into the second cylindrical accommodation portion 30e that is formed inside the protrusion portion 30b protruding leftward in the axial direction, the left axial end portion of the cylindrical portion 32a of the center post 32 can be disposed adjacent to the side plate 30k in a state where the left axial end portion of the cylindrical portion 32a is in contact with the side plate 30k of the protrusion portion 30b of the solenoid case 30 in the radial direction; and thereby, it is possible to further increase a magnetic force applied to the plunger 4 by securing a magnetic flux flow path with reduced magnetic resistance between the annular step portion 30c of the solenoid case 30 and the left axial end portion of the cylindrical portion 32a of the center post 32.

In addition, since the cylindrical portion 32a of the center post 32 is such long that the left axial end portion of the cylindrical portion 32a of the center post 32 can be accommodated in the second cylindrical accommodation portion 30e formed inside the protrusion portion 30b of the solenoid case 30, it is possible to enlarge the circle of a magnetic flux flow path on an outer periphery of the coil 34; and thereby, it is possible to apply a high magnetic force to the plunger 4.

Second Embodiment

Subsequently, a solenoid valve according to a second embodiment of the present invention will be described with reference to FIG. 5. Incidentally, the same reference signs are assigned to the same configuration parts as the configuration parts illustrated in the foregoing first embodiment, and the repeated descriptions will be omitted.

A solenoid valve 101 in the second embodiment will be described. As illustrated in FIG. 5, a solenoid unit 103 is mainly formed of the solenoid case 30, a molded solenoid body 131 that is accommodated in the solenoid case 30, and the center post 32 that is disposed inside the molded solenoid body 131.

A bobbin 133 of the molded solenoid body 131 is formed to be substantially U-shaped in a sectional view and includes a cylindrical portion 133a that extends straight in the axial direction along the outer periphery of the cylindrical portion 32a of the center post 32, a flange portion 133b that extends in the radial direction from the right axial end portion of the cylindrical portion 33a along the left axial end face of the flange portion 32c of the center post 32, and a flange portion 133c that extends in the radial direction from the left axial end portion of the cylindrical portion 33a along the annular planar portion 30f which is equivalent to the inner face of the end plate 30n of the annular step portion 30c of the solenoid case 30.

Accordingly, the cylindrical portion 32a of the center post 32 can be formed separately from the molded solenoid body 131; and thereby, it is possible to easily assemble the solenoid unit 103.

The embodiments of the present invention have been described above with reference to the drawings; however, the specific configuration is not limited to these embodiments, and also changes or additions can be included in the present invention without departing from the scope of the present invention.

For example, in the foregoing embodiments, a mode where the left axial end face of the holder 36 which is attached to the open end on the left axial side of the cylindrical portion 32a of the center post 32 is provided slightly apart from an end face of the bottom plate 30m of the protrusion portion 30b of the solenoid case 30 has been described; however, the left axial end face of the holder 36 may be just in contact with the end face of the bottom plate 30m of the protrusion portion 30b of the solenoid case 30 to a degree that the cylindrical portion 32a of the center post 32 does not receive any forces from the solenoid case 30 upon the swaging process.

In addition, the holder 36 may not be attached to the open end on the left axial side of the cylindrical portion 32a of the center post 32.

In addition, in the foregoing embodiments, as the method for integrally forming the molded solenoid body 31 and the center post 32, the steps of processing where after the bobbin 33 is integrally molded with the center post 32 and the coil 34 is wounded therearound, the molded solenoid body 31 and the center post 32 are integrally molded with the resin 35 have been described; however, the present invention is not limited to these steps of processing, and different steps of processing where after the coil 34 is wound around the bobbin 33 and the center post 32 is inserted thereinto, the molded solenoid body 31 and the center post 32 are integrally molded with the resin 35 may be adopted, or the integral formation may be performed by methods other than molding.

REFERENCE SIGNS LIST

1 Solenoid valve
2 Valve unit
3 Solenoid unit
4 Plunger (movable iron core)
5 Rod
6 Swaging table
6a Upper face
7 Swaging bar
21 Sleeve
22 Spool
23 Retainer
30 Solenoid case
30a Cylindrical portion
30b Protrusion portion
30c Annular step portion (step portion)
30d First cylindrical accommodation portion
30e Second cylindrical accommodation portion
30f Annular planar portion
30g Claw portion (first axial end of Solenoid case)
30h Annular planar portion
30j Opening portion
30k Side plate
30m Bottom plate
30n End plate
31 Molded solenoid body
32 Center post (stationary iron core)
32a Cylindrical portion
32b Thin portion
32c Flange portion
32d Through hole
32e Recess portion
33 Bobbin
33a Cylindrical portion
33b, 33c Flange portion
33d Annular protrusion portion
34 Coil
35 Resin
36 Holder
60 Recess portion
101 Solenoid valve
103 Solenoid unit
131 Molded solenoid body
133 Bobbin
133a Cylindrical portion
133b, 133c Flange portion

The invention claimed is:

1. A solenoid valve comprising:
a movable iron core that is movable in an axial direction between a first axial end side and a second axial end side of the solenoid valve opposite to each other in the axial direction;
a molded solenoid body that is disposed outside the movable iron core in a radial direction;
a solenoid case that accommodates the movable iron core and the molded solenoid body; and
a stationary iron core that is disposed inside the molded solenoid body in the radial direction, and generates a magnetic force between the movable iron core and the stationary iron core when a coil of the molded solenoid body is energized, the stationary iron core including a thin portion which is circumferentially formed and a flange portion that is formed on the first axial end side to extend outward in the radial direction,
wherein the solenoid case includes a cylindrical portion that covers an outer periphery of the molded solenoid body, a protrusion portion formed in a bottomed cylindrical shape on the second axil end side with respect to the cylindrical portion and having a diameter smaller than a diameter of the cylindrical portion, and an end plate formed to extend in a radial direction and connect the protrusion portion to the cylindrical portion,
wherein an annular planar portion extending in the radial direction is formed inside the solenoid case in the radial direction, the flange portion is swaged between a claw portion of the solenoid case formed on the first axial end side and the annular planar portion of the solenoid case, and the stationary iron core, is isolated from the protrusion portion of the solenoid case on the second axial end side.

2. The solenoid valve according to claim 1,
wherein the molded solenoid body is integrally formed with the stationary iron core, and a gap is formed in the axial direction between the end plate of the solenoid case and one axial end of the molded solenoid body on a side of the second axial end of the stationary iron core.

3. The solenoid valve according to claim 2,
wherein the protrusion portion having a bottom plate formed in a disk shape and a side plate formed in a cylindrical shape and orthogonally connected to the bottom plate to extend in the axial direction, and
a step portion is formed by the end plate and the side plate outside the thin portion in the radial direction.

4. The solenoid valve according to claim 3,
wherein the stationary iron core is fitted into the protrusion portion on the second axial end side.

5. The solenoid valve according to claim 2,
wherein the stationary iron core is fitted into the protrusion portion on the second axial end side.

6. The solenoid valve according to claim 5,
wherein thickness of the thin portion is 0.4 mm or less.

7. The solenoid valve according to claim 2,
wherein thickness of the thin portion is 0.4 mm or less.

8. The solenoid valve according to claim 1,
wherein the protrusion portion having a bottom plate formed in a disk shape and a side plate formed in a cylindrical shape and orthogonally connected to the bottom plate to extend in the axial direction, and
a step portion is formed by the end plate and the side plate outside the thin portion in the radial direction.

9. The solenoid valve according to claim 8,
wherein the stationary iron core is lifted into the protrusion portion on the second axial end side.

10. The solenoid valve according to claim 8,
wherein thickness of the thin portion is 0.4 mm or less.

11. The solenoid valve according to claim 1,
wherein the stationary iron core is fitted into the protrusion portion on the second axial end side.

12. The solenoid valve according to claim 11,
wherein thickness of the thin portion is 0.4 mm or less.

13. The solenoid valve according to claim 1,
wherein thickness of the thin portion is 0.4 mm or less.

* * * * *